UNITED STATES PATENT OFFICE.

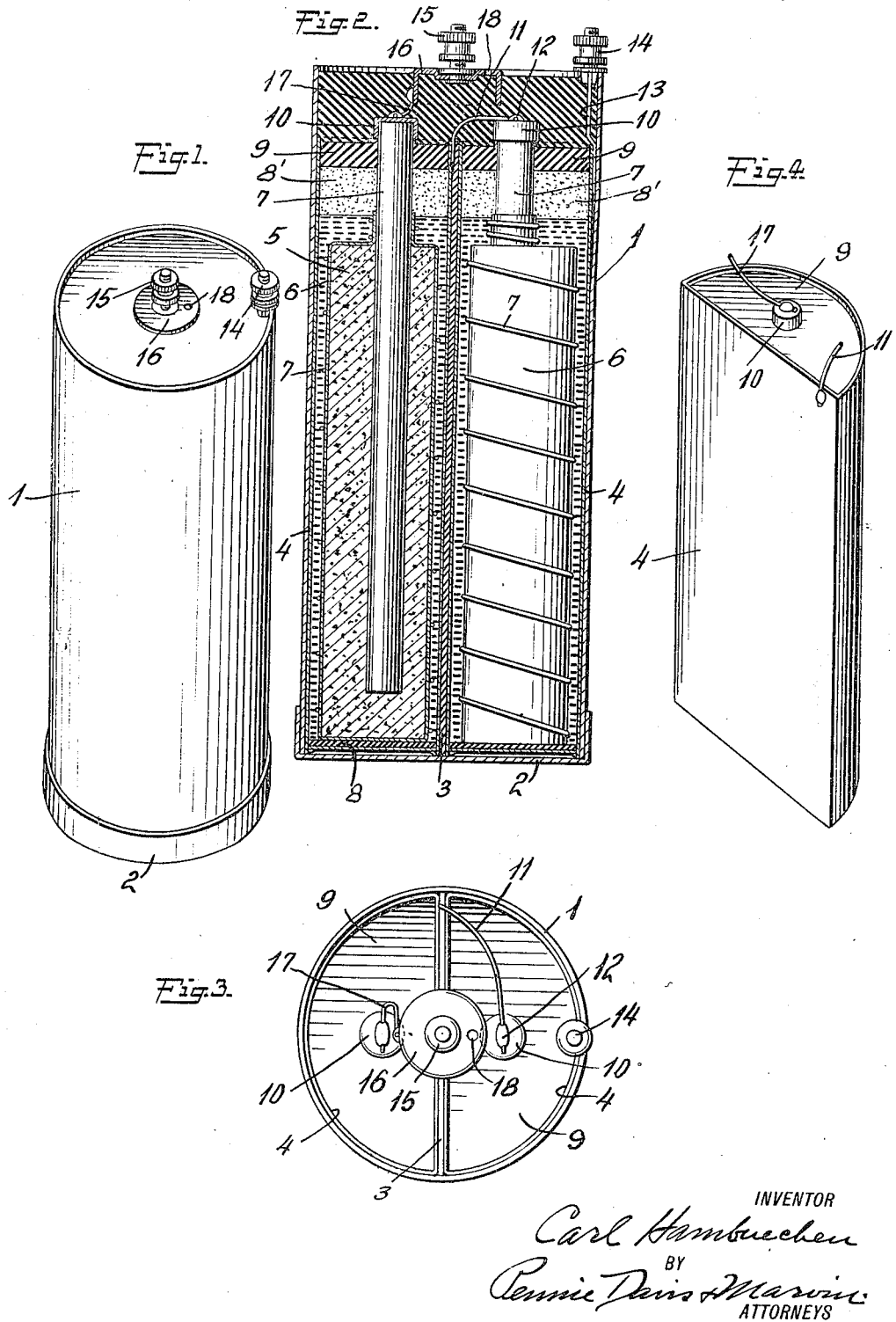

CARL HAMBUECHEN, OF BELLEVILLE, ILLINOIS, ASSIGNOR TO AMERICAN CARBON & BATTERY COMPANY, OF EAST ST. LOUIS, ILLINOIS, A CORPORATION OF ILLINOIS.

BATTERY.

1,224,376.　　　　Specification of Letters Patent.　　Patented May 1, 1917.

Application filed January 22, 1917. Serial No. 143,600.

*To all whom it may concern:*

Be it known that I, CARL HAMBUECHEN, a citizen of the United States, residing in Belleville, county of St. Clair, and State of Illinois, have invented certain new and useful Improvements in Batteries; and I do hereby declare the following to be a full, clear, and exact description of the invention, such as will enable others skilled in the art to which it appertains to make and use the same.

The present invention relates to portable dry batteries of the kind commonly used for telephone work, the ignition of gas engines, electric hand lanterns, and the like.

It is an object of the present invention to provide a battery of ordinary outward appearance, say, for instance, of the six inch type commonly used for telephone work, but which shall have substantially twice the voltage of such batteries as ordinarily constructed. This result I am able to attain by assembling within the outer carton, a pair of dry cells, suitably connected in series, so that the voltage of one shall be added to the voltage of the other, and thereby give a substantially double voltage at the battery binding posts.

To effect the foregoing object, and others which will hereinafter appear, or which are necessarily inherent in the construction disclosed, and to secure other advantages hereinafter pointed out, I make each of the dry cells of substantially semi-cylindrical form and complete in itself; and with suitable insulation between the adjacent flat sides of the companion cells, I connect the cells in series and to suitable binding posts. Thereafter, sealing material is poured in to close the end of the carton, giving it substantially the same appearance as a dry cell of the usual type, and at the same time holding the several parts in their assembled relation and giving adequate support and protection to the various conducting elements, whereby the series relation between the cells is established and maintained.

In the accompanying drawings, forming a part hereof—

Figure 1 is a perspective elevation of the completed battery, illustrating its close resemblance to an ordinary dry cell;

Fig. 2 is a transverse longitudinal section through the carton and the battery containers, certain of the parts being shown in elevation;

Fig. 3 is a plan view of the two cells and their central binding posts connected in series relation and ready to receive the wax seal by which the carton is closed and the battery conductors enveloped; and Fig. 4 is a perspective view of the dry cell at the left in Fig. 2.

In the embodiment illustrated in the drawings, the battery comprises an insulating carton 1, as of pasteboard, which may be of standard dimensions, say six inches high, and closed at its bottom with a pasteboard cap 2 glued in place in usual manner. Extending longitudinally of the carton and dividing it into two equal compartments is a pasteboard partition 3 which preferably is made somewhat shorter than the carton, as shown, to permit the more ready establishment of the series connection between the two dry cells. In each of the semi-cylindrical compartments so formed is a dry cell having a zinc container 4 of semi-cylindrical shape. The two companion dry cells have their adjacent flat faces spaced apart and insulated by the interposed partition of pasteboard or the like.

Each zinc container serves as the positive electrode of a dry cell and also holds the other active elements of the cell which, in the embodiment here disclosed, comprise a negative electrode consisting of a compressed semi-cylindrical block 5 of manganese dioxid, or equivalent depolarizer, mixed with carbon or graphite or similar carbonaceous material, and enveloped in a bibulous envelop 6 of cheese cloth, or the like, wrapped about with a string 7 to hold it in position during assembly of the cell. Embedded in the molded mixture of manganese dioxid and carbonaceous material is a carbon terminal 7 which serves to establish electrical connection with the molded mass in a manner well understood in the art. The bottom of the container may be provided with a tar paper lining 8 on which the negative electrode rests and may be filled to above the level of the molded mass with gelatinized electrolyte of appropriate composition for use in dry cell work, and comprising, for instance, a mixture of starch paste with an aqueous solution of ammonium chlorid mixed with zinc chlorid. A layer 8′ of sand may be introduced above the electrolyte in accordance with usual practice, and each cell is preferably provided with a seal 9, of pitch, or the like, whereby the electrolyte is prevented from evaporating and rigid relationship is maintained between the zinc container and its contents. The carbon terminal, which as here illustrated may be in the form of a cylindrical rod, projects through this seal and may be equipped with a brass cap 10 driven on with a tight fit, as is customary in the art.

To assemble the complete battery, forming the subject-matter of the present invention, two of these dry cells are slipped into the semi-cylindrical compartments formed by the insulating partition 3, and are then connected in series in appropriate manner. Preferably, the left-hand cell of Fig. 2, before being introduced into the carton, has soldered thereto, on its flat face, a conductor 11, which may be in the form of a wire, and which subsequently is soldered at 12 to the brass cap of the companion cell, thereby serving as a cross-connecting conductor as shown in Fig. 2.

In the embodiment illustrated, the right-hand cell of Fig. 2 has, soldered to its zinc container, a metal strip 13 which is offset just above the top edge of the container, and to the upper end of which is connected, as by soldering, a binding post 14 of usual form and positioned just above the edge of pasteboard carton 1 to present substantially the same appearance as with dry cells of more usual type. The other binding post 15 is preferably riveted to a brass cap 16, which is connected with the left-hand cell (Fig. 2), as by a conductor or wire 17.

After the elements above described have been assembled within the carton, a sealing material, such as sealing wax, as used in the battery industry, is poured in on top of the pitch seals of the cells up to substantially the top of the pasteboard carton 1. Cap 16 has a venting perforation 18 to permit the escape of entrapped air, and when the wax hardens, it not only envelops the carbon terminals and their respective pitch seals, but it also envelops and gives firm support to cross-connecting conductor 11 and to cap 16 and its associated parts. The wax also can run behind strip 13, filling up the space between the strip and the carton, and giving rigidity to the strip so that it may withstand the strains to which it is likely to be subjected when the battery is roughly handled.

By the arrangement above described, I have succeeded in providing a battery which to all outward appearances is substantially the same as an ordinary No. 6 dry cell, and yet the effective voltage of this battery is in the neighborhood of three volts, as compared with the one and one-half volts obtainable from a single cell. The area of zinc available for electrolytic action is much greater than if in cylindrical form, almost twice as much, and the carbon rods 7 insure intimate contact with the compressed mass of each negative electrode. The internal resistance of the cells is relatively low. Furthermore, I attain these advantageous results by methods of manufacture and assembly which are easy of accomplishment on a factory basis. The individual cells can be made up complete, and later, as needed, can be assembled in their cartons without troublesome procedure. The hot sealing wax poured in to seal the carton softens the individual pitch seals and thereby, in effect, re-seals the cells. The wax also takes a firm hold on the softened pitch and, by so doing, binds all the parts into a substantially rigid structure capable of withstanding the rough usage to which dry batteries are subjected in ordinary practice. The arrangement utilizes to very good advantage the space available within a cylindrical carton of given dimensions, so that a relatively high watt output is obtainable even at the double voltage.

I am aware that certain changes in the details of this preferred embodiment may be made without departing from the spirit of the invention, as defined by the appended claims.

I claim:—

1. In a battery, the combination of a cylindrical pasteboard carton, a partition therein somewhat shorter than the carton and dividing it longitudinally into two substantially equal compartments, a dry cell in each of said compartments, said dry cells having zinc containers of substantially semi-cylindrical shape and insulated from one another by said partition, a cross-connecting conductor between the zinc container of one cell and the carbon terminal of its companion cell, sealing means about said carbon terminals and closing the top end of said carton, a metal cap embedded in and supported by said sealing means, and a conductor connecting said cap with a carbon terminal; substantially as described.

2. In a battery, the combination of a cylindrical pasteboard carton, a partition in said carton dividing it longitudinally into two equal compartments, a dry cell in each of said compartments, said dry cells having zinc containers of semi-cylindrical shape and insulated from one another by said partition, one of said containers having attached thereto a binding post serving as a battery terminal, a carbon terminal for each of said dry cells, sealing material about each carbon terminal and independently sealing the contents of its zinc container, a central binding post positioned substantially axially of said carton to serve as the other battery terminal, a cap on which said binding post is mounted, conductors connecting said cells in series to said binding post, and a wax seal closing the top end of said carton and supporting said central binding post and enveloping said conductors; substantially as described.

3. In a battery, the combination of a cylindrical carton, a partition somewhat shorter than said carton and dividing it longitudinally into two substantially equal compartments, a dry cell in each of said compartments, said dry cells having zinc containers of substantially semi-cylindrical shape and insulated from one another by said partition, one of said containers having a binding post serving as a battery terminal and connected with said container through an upright metal strip located adjacent the wall of said carton, a carbon terminal for each of said dry cells, a pitch seal about each carbon terminal and independently sealing the contents of its zinc container, a central binding post positioned above said partition to serve as the other battery terminal, a metal cap on which said binding post is mounted, a conductor secured to said cap and to the carbon terminal of one of said cells, a cross-connecting conductor secured to the zinc container of said last-named cell and to the carbon electrode of the other cell, said conductors thereby connecting said cells in series to give approximately three volts at said battery terminals, and sealing material closing the top end of said carton and supporting said central terminal cap and enveloping said conductors; substantially as described.

4. In a battery, the combination of a cylindrical pasteboard carton closed at the bottom with a pasteboard cap, a pasteboard partition somewhat shorter than said carton and dividing it longitudinally into two equal compartments, a dry cell in each of said compartments, said dry cells having zinc containers of semi-cylindrical shape and insulated from one another by said partition, one of said containers having a binding post serving as a battery terminal and connected with said container through an upright metal strip which is offset and thereby spaced from the adjacent side of the carton, a carbon terminal for each of said dry cells, a pitch seal about each carbon terminal and independently sealing the contents of its zinc container, a central binding post positioned above said pasteboard partition to serve as the other battery terminal, a perforate metal cap on which said binding post is mounted, a conductor secured to said cap and to the carbon terminal of one of said cells, a cross-connecting conductor secured to the zinc container of said last-named cell and to the carbon electrode of the other cell, said conductors thereby connecting said cells in series to give approximately three volts at said battery terminals, and sealing wax closing the top end of said carton and supporting said central terminal cap and enveloping said conductors and said offset metal strip; substantially as described.

In testimony whereof I affix my signature.

CARL HAMBUECHEN.